(12) United States Patent
Craig

(10) Patent No.: US 6,658,572 B1
(45) Date of Patent: Dec. 2, 2003

(54) AIRLINE COCKPIT SECURITY SYSTEM

(75) Inventor: Stanley M. Craig, Mesa, AZ (US)

(73) Assignee: Secure Sky Ventures International LLC, Mesa, AZ (US)

( * ) Notice: Subject to any disclaimer, the term of this patent is extended or adjusted under 35 U.S.C. 154(b) by 58 days.

(21) Appl. No.: 10/000,115

(22) Filed: Oct. 31, 2001

(51) Int. Cl.[7] .............................................. H04L 9/00
(52) U.S. Cl. ..................................................... 713/200
(58) Field of Search ........................... 713/200; 455/66, 455/12.1, 67.1, 431, 436, 428, 430; 250/222.1; 244/190; 340/561, 825.72

(56) References Cited

U.S. PATENT DOCUMENTS

| | | |
|---|---|---|
| 4,706,091 A | 11/1987 | Scott |
| 4,875,646 A * | 10/1989 | Browning et al. ........... 244/190 |
| 4,887,070 A * | 12/1989 | Pinto et al. .................. 340/561 |
| 5,159,344 A | 10/1992 | Robinson et al. |
| 5,463,372 A | 10/1995 | Mawyer, Sr. |
| 5,479,162 A | 12/1995 | Barger et al. |
| 5,519,255 A | 5/1996 | Burtch et al. |
| 5,531,402 A | 7/1996 | Dahl |
| 5,825,021 A * | 10/1998 | Uemura ...................... 250/222.1 |
| 5,829,444 A * | 11/1998 | Ferre et al. .................. 128/897 |
| 6,173,159 B1 * | 1/2001 | Wright et al. .................. 455/66 |
| 6,249,868 B1 | 6/2001 | Sherman et al. |
| 6,272,345 B1 * | 8/2001 | Worger et al. ............... 455/436 |

* cited by examiner

*Primary Examiner*—Ly V. Hua
(74) *Attorney, Agent, or Firm*—Schmeiser, Olsen & Watts LLP (57) ABSTRACT

The present invention is directed to preventing a hijacker from gaining sufficient flight control of an airliner to use it to do harm. One embodiment of the invention detects when the pilot is not seated and verifies the authorization for the seat to be empty. If the required authorization is not timely provided, a processor executes a hijacking response that includes locking out the flight controls, uninterruptibly and autonomously communicating events on-board the aircraft to ground controllers and others, and uninterruptibly and autonomously navigating the aircraft to a safe landing without control inputs from the cockpit. The present invention, a vehicle security system, is also useful on other vehicles. An embodiment for an automobile is described.

48 Claims, 8 Drawing Sheets

AIRLINE COCKPIT SECURITY SYSTEM

BACKGROUND OF THE INVENTION

1. Technical Field

This invention relates generally to vehicle security. It also relates more specifically to methods and apparatus for preventing hijackers and thieves from gaining control of an airliner or other vehicle and methods and apparatus for responding to attempts by hijackers to obtain control of an airliner or other vehicle.

2. Background

The recent attacks on the World Trade Center, the Pentagon, and Flight 93 have heightened interest in airline security against hijacking. In particular, the realization that commercial airlines can be easily hijacked and used as weapons of war has focused the nation's attention on airline security issues. The novel feature of the events of Sep. 11, 2001 was that the hijackers did not attempt to influence the pilots to change course. Instead, the hijackers took the controls for their own purposes. This "control hijacking" is a new phenomena for aircraft hijacking and innovative methods are required to defend against it.

The American people have already made great strides in combating the control hijacking problem. The passengers of Flight 93 demonstrated the solution of attacking the hijackers to deny them control of the aircraft. Since that event, one attempted cockpit intrusion and one bus hijacking have met with a similar response from American passengers. It is unfortunate that all of the passengers of Flight 93 died demonstrating their solution. Better security systems are needed to bring passengers safely home from such conflicts.

Vehicle security systems of different types are known. Each is focused on either disabling the motive power of the vehicle or limited to broadcasting vehicle location and security information. Disabling the motive power of the vehicle is inappropriate for winged aircraft in flight. Broadcasting the vehicle's location is useful for aircraft emergencies but, when used alone as a response to a control hijacking, it provides only the grim protection of making the plane easy for Air Force jets to find. The art lacks a vehicle security system which safely disables a hijacker's or thief's ability to control a aircraft.

SUMMARY OF THE INVENTION

The present invention is directed to preventing a hijacker from gaining sufficient flight control of an airliner to use it to do harm. One embodiment of the invention detects when the pilot is seated and verifies the authorization of the pilot at the controls. If the expected person is not seated at the controls, a processor executes a hijacking response that includes locking out the flight controls, uninterruptibly and autonomously communicating events on-board the aircraft to ground controllers and others, and uninterruptibly and autonomously navigating the aircraft to a safe landing without control inputs from the cockpit. Sensors and processors also detect when a pilot's seat is empty and interrogate the station for authorization for the seat to be empty. Only the pilot authorized to use that station can provide the empty-seat authorization. If an empty-seat authorization is not received, embodiments of the invention execute a hijacking response. Embodiments of the invention also provide more generally for verifying the identity of a person seeking access to any part of an airliner and for locking out control access, sounding alarms, and making safe the system when unauthorized access is attempted or an unauthorized absence is detected. Other embodiments of the invention relate to securing access to any type of propelled, controllable vehicle, especially those navigated by computer (airliners, cargo ships, trains, spacecraft, elevators, without limitation) by verifying the identity of the operator, locking out the controls if an authorized operator is not present, sounding alarms to those who respond to a control hijacking, and autonomously navigating the vehicle to safety. Embodiments of the invention address control hijacking of aircraft in flight and control hijacking while the plane is on the ground, as well as control hijacking of other vehicles.

Embodiments of the present invention also to increase the confidence of airline passengers in the safety of flying by providing an apparatus that makes commercial airliners unattractive targets for control hijacking by preventing the use of airliners to do harm. Additionally, use of an embodiment of the invention makes a safe landing of the aircraft likely even if the flight crew is dead or taken prisoner and also enhances passenger safety even for non-hijacking emergencies such as impacts with birds, collisions with general aviation aircraft, and the like.

BRIEF DESCRIPTION OF THE DRAWINGS

The foregoing and other features and advantages of the invention will be apparent from the following more particular description of specific embodiments of the invention, as illustrated in the accompanying drawings, wherein.

DETAILED DESCRIPTION OF EMBODIMENTS OF THE INVENTION

Large modern airliners use predominantly fly-by-wire control systems with some hydraulic controls. Fly-by-wire systems, as known in the art, use electrical signals to operate aerodynamic flight control surfaces of the aircraft and other vehicle control mechanisms. Two advantages of fly-by-wire systems are computer processing of the control inputs and compatibility with programmable electronic autopilots. Computer processing of the control inputs allows for computer compensation for the flight regime (air speed, atmospheric temperature and pressure, flap position, and the like) to optimize the flight control of the aircraft. Computer compensation may prevent disastrous combinations of flight control inputs from being implemented. Fly-by-wire systems are compatible with electronic autopilots in that the autopilot computer's output can be easily converted to flight control signals, thereby allowing the computer to fly the plane. The flight control input devices for a fly-by-wire aircraft produce electrical signals proportional to the pilot's manual movement of the flight control input devices. Those electrical signals are processed to translate the signals into flight actuator input electrical signals which are then sent by electrical wire to the flight actuators. The flight actuators move the aerodynamic flight control surfaces and engine controls in response to the flight actuator input electrical signals in order to fly the aircraft according to the pilot's flight control input device manipulations.

For a majority of the time for a flight, large commercial airliners are flown not by direct pilot manipulation of traditional flight control input devices, but by computerized autopilot. Within reach of the seated pilot is a computer terminal for making inputs into the flight data management system (FDMS). The FDMS is the human interface to a computerized autopilot normally used to fly the aircraft. The FDMS allows the pilot to press keyboard keys to enter flight planning data to create a flight plan. The flight plan is executed by the autopilot at the pilot's initiation. For properly equipped aircraft, the autopilot can also land the aircraft at airports equipped for instrument landing system (ILS) approaches. Normally, the pilot can override the autopilot by executing an established procedure. The FDMS and other devices for programming autopilots are modern flight control input devices.

Figure 1:
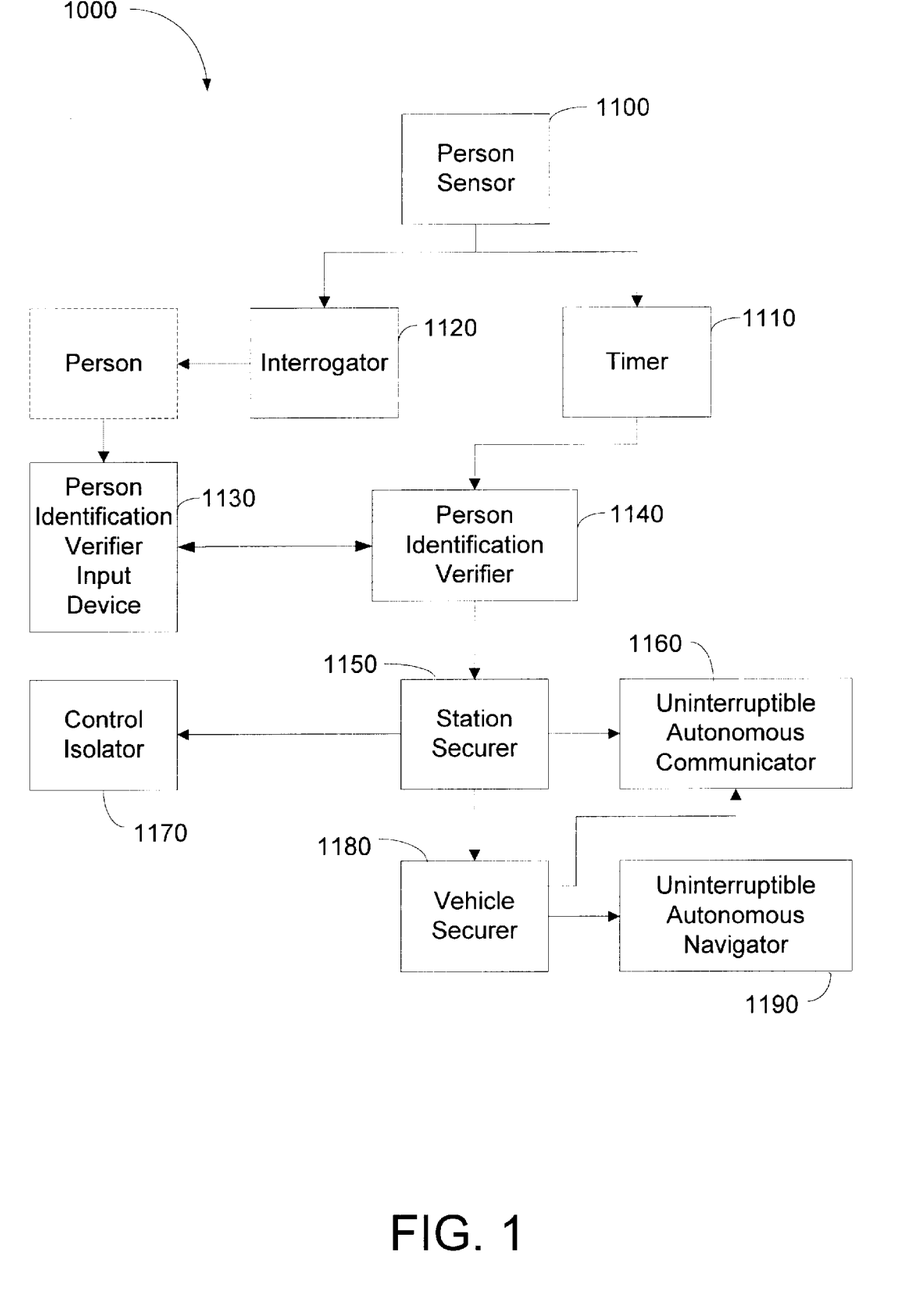
FIG. 1 is a functional block diagram of the elements of an embodiment of the present invention showing representative relationships between the elements.

FIG. 1 is a block diagram of a particular embodiment of the vehicle security system 1000. The vehicle is a propelled, controllable vehicle having a station comprising the vehicle control input devices and a place for the operator to occupy. The place for the operator to occupy is viewed by a person sensor 1100, which detects the absence or presence of a person and also detects changes in the occupancy state of the place for the operator to occupy. The person sensor 1100 can be any type of sensor that can determine either the presence or the absence of a person in the place to occupy and changes in the input. For example, the person sensor 1100 may also be a suite of person sensors 1100 and logic to fuse their data into a conclusion regarding the presence or absence of a person in the place to occupy. Upon determining that a change of occupancy state has occurred, the person sensor 1100 activates the timer 1110 and the interrogator 1120. The timer 1110 begins counting a predetermined time and the interrogator 1120 signals any person within the station to enter authorization data. The data is entered by the person through the person identification input device 1130. The type of device 1130 used will depend on the type of data used for authorization. If the person enters the correct authorization data before the timer 1110 counts to the predetermined time, then the vehicle security system 1000 is reset and vehicle operations continue normally. If the authorization data input is not made before the timer 1110 counts to a predetermined time, then the vehicle security system 1000 executes a hijack response. The hijack response includes the station securer 1150 initiating the control isolator 1170 to lock out all of the vehicle control input devices at the station that failed authorization. Locking out the vehicle control input devices means preventing any of the vehicle control input devices from influencing the operation of the vehicle. Depending on the vehicle, this may include, for example, mechanical locks, electrical switches, optical decoupling, or hydraulic valve activation. The station securer 1150 may also execute uninterruptible autonomous communication 1160. The uninterruptible autonomous communicator 1160 automatically and, in some embodiments, continuously communicates with persons outside the vehicle in ways that cannot be interrupted by persons inside the vehicle. The data communicated informs persons outside the vehicle that the authorization code has not been properly entered, and may provide them with information upon which to formulate a response. If the vehicle has multiple stations for operators, the vehicle is operated from a station that is not secured. If all the stations on a vehicle are locked out, including the case where there is only one station, then the vehicle securer 1180 executes the uninterruptible autonomous navigator 1190 and adds data to that communicated by the uninterruptible autonomous communicator 1160. Uninterruptible autonomous navigation 1190 automatically operates the vehicle in ways that cannot be interrupted by persons inside the vehicle. The uninterruptible autonomous navigator 1190 operates the vehicle to a achieve a safe condition for those inside the vehicle.

Figure 2:
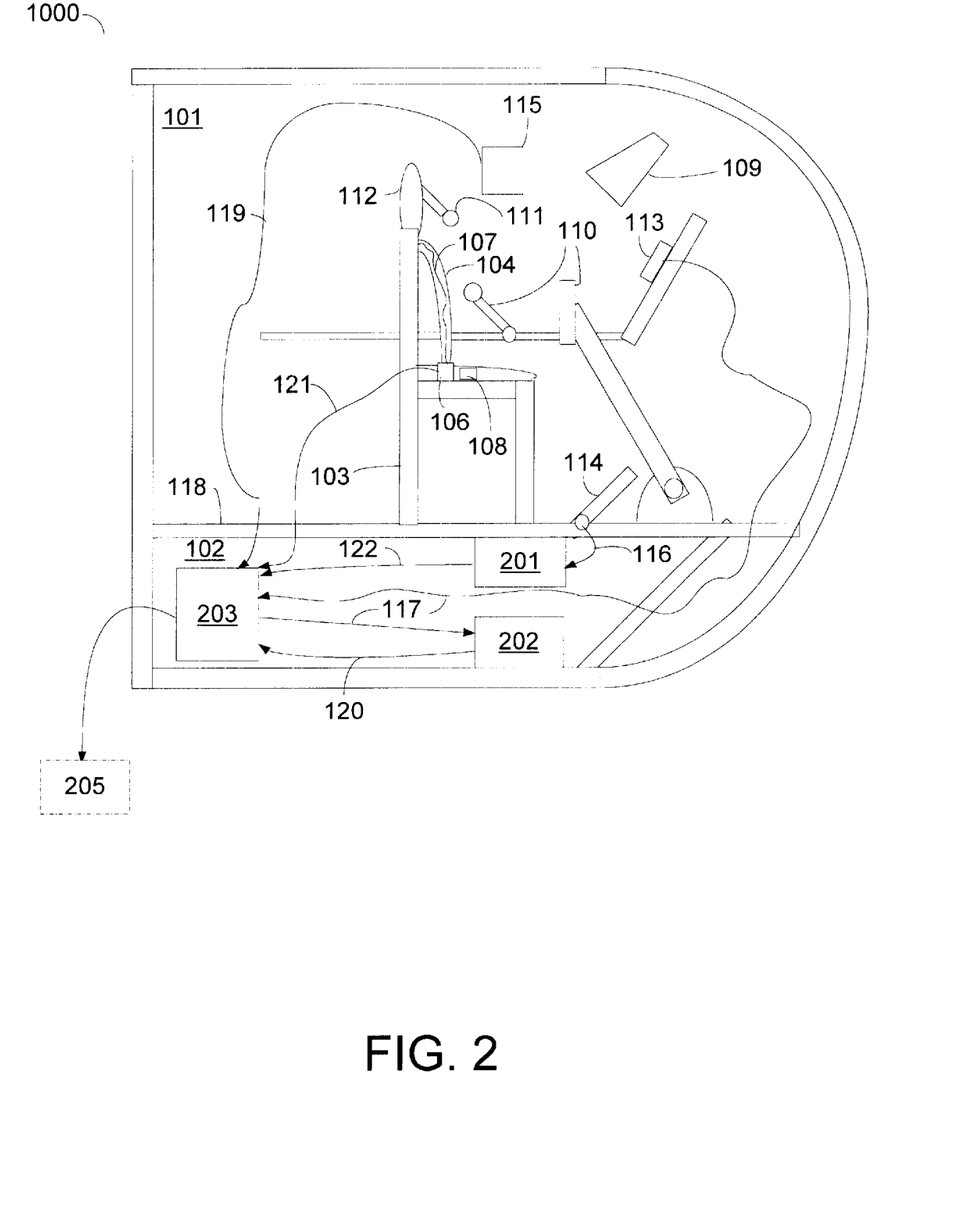
FIG. 2 is a diagram of illustrative physical elements of an embodiment of the present invention for an aircraft showing representative relationships between the elements.

FIG. 2 is a diagram of a particular embodiment of the vehicle security system 1000 in which the vehicle is an aircraft. The following discussion refers to both FIG. 1 and FIG. 2. In this embodiment, the station is an aircraft cockpit 101, the operator is a pilot, and the place for the operator to occupy is the pilot's seat 103. The vehicle controls are flight control input devices 110 (throttles and yoke), 113 (autopilot control interface), and 114 (rudder pedals). Less than all of the flight control input devices 110, 113, and 114 normally found on an aircraft are notionally illustrated in the diagram of FIG. 1. It should be understood that those flight control input devices 110, 113, and 114 shown and discussed are representational of the entire set of flight control devices and other vehicle control devices (for example, landing gear) contained in the cockpit. Some elements of the vehicle security system 100 are deployed in the cockpit 101 and some may be deployed in instrument bay 102. Cockpit 101 contains the pilot's seat 103 which is equipped with a seat belt 104.

Cockpit 101 and pilot's seat 103 may contain person sensors. One embodiment of a person sensor comprises a seatbelt interlock 106 to detect if the seat belt 104 is fastened or unfastened. The seatbelt interlock 106 includes a switch, integrated at least partially into the seatbelt buckle, which changes state depending upon the state of the buckle as fastened or unfastened. In variants of this embodiment, the seatbelt interlock 106 may be electro-mechanical, electro-optical, magnetic, or even fluidic. A change in the state of the seatbelt interlock 106 is read as a change in the occupancy state of the pilot's seat 103 requiring entry of authorization data. The seatbelt interlock 106 may also be combined with seatbelt web circuits 107 to detect if the seatbelt 104 has been severed. The seatbelt web circuits 107 of the present embodiment are electrical conductors which are woven along the entire length of each piece of seatbelt 104 and back again to form a loop in each discrete piece of seatbelt 104. A small current normally runs through this electrically conductive loop. Each loop is connected to a detector which changes state if the loop circuit opens. If the seatbelt 104 is severed, the detector detects an absence of the electrical current resulting from an open circuit. That detection is read as a change in the occupancy state of the pilot's seat 103 requiring entry of authorization data. In variants of the present embodiment, the web circuits 107 may alternatively be fiber optic or fluidic. In other variants of the present embodiment, the web circuits 107 may comprise multiple circuits in each discrete piece of webbing making up the seatbelt 104. The multiple web circuits 107 may be of different types. In another embodiment of the web circuits 107, the current or other energy flowing through the web circuits 107 is modulated to make tampering more difficult. In that embodiment, the detector compares the loop input modulation with the loop output modulation to determine if the signal being returned is the same as the one sent. If the input and output modulation are significantly different, a change in the occupancy state of the pilot's seat 103 is signaled by the detector.

Another embodiment of the person sensor 1100 is a pilot mass sensor 108 used to determine whether or not someone is seated in the pilot's seat. The mass sensor 108 is more reliable in determining the absence of a person than the presence of one. When gravity acts on the mass of a seated person, a force is exerted against the pilot's seat 103. This force may be used to close or open one or more switches in the pilot's seat 103, thereby accomplishing a pilot mass sensor 108. The absence of mass in the pilot's seat 103 is a good indication that the pilot is not in the pilot's seat 103. However, the presence of mass in the pilot's seat 103 is not as good an indicator of the pilot's presence, as the mass could be luggage, books, or other forms of non-pilots. Pilot mass sensors 108 may also be susceptible to error caused by aircraft accelerations. Therefore, in some embodiments, the mass sensor output is compensated for vehicle acceleration. As with other person sensors 1100, variants of the present embodiment may include pilot mass sensors 108 of different types. For example, electrical, electro mechanical, electrooptical, or fluidic sensors may be used. Other variants of the present embodiment of a pilot mass sensor 108 may use multiple mass sensors 108, permissibly of different types in the same embodiment, along with sensor data fusion to accomplish a pilot mass sensor 108.

Another embodiment of the person sensor is an electromagnetic energy person sensor 109 for detecting whether or not a person is seated in the pilot's seat. For example, the electromagnetic energy person sensor may be a staring infrared sensor. Those skilled in the art will recognize that other staring and scanning sensors of electromagnetic signatures emitted or reflected by living persons will serve the purpose of electromagnetic energy person sensor 109. The placement of the electromagnetic sensor 109 in FIG. 1 is merely notional. The actual placement will depend on the sensor and the arrangement of the cockpit. For example, an electromagnetic energy sensor that is a brain-wave detector might be placed in the headrest 112 of pilot's seat 103, the pilot's headset (not shown), or independently attached to the pilot's head (not shown). For a more complex example, a video camera together with an image processor may be configured as an electromagnetic energy person sensor 109.

Variations to the present embodiment of the invention may use more than one person sensor 1100 at a time, with a logic circuit responsive to a plurality of person sensors 1100 for determining the occupancy state of the pilot's seat 103. The output of each person sensor 1100 or suite of person sensors 1100 has at least two states. A first state indicates that no person is present and a second state indicates that a person is present. In particular embodiments, the outputs of person sensors may be recorded.

The person sensors 106–109, individually or in concert, detect the presence or the absence of a person in the pilot's seat 103. The person sensor 1100 output is communicated to the person identification verifier 1140. Whenever the occupancy status of the pilot's seat 103 changes, authorization is required. Thus, in one embodiment of the invention, if the pilot leaves his seat 103, he may be required to enter authorization data into the person identification verifier input device 111 or 115 (1130 in FIG. 1) to let the vehicle security system 1000 know that his absence is authorized. Likewise, when the pilot sits back down again, he may be required to enter an authorization code to indicate to the, vehicle security system 1000 that his presence is authorized.

In an embodiment of the invention, when the person sensors 106–109 (1100 in FIG. 1) detect a change in the occupancy state of the pilot's seat 103, detection of a state change starts a timer 1110. The timer 1110 gives the pilot an interval to enter the pilot's authorization data before the vehicle security system 1000 executes a hijacking response. The timer 1110 runs for a predetermined interval and, if no valid authorization data is received, the flight control input devices 110, 113, 114 for that pilot's seat 103 are locked out. In this embodiment, the predetermined time allows for the authorization data to be entered twice, to allow for human error.

In most embodiments of the invention, flight control input devices 110, 113, and 114 and the person identification verifier input devices 111 and 115 are within reach of a pilot in the pilot's seat 103. The flight control input devices 110, 113, and 114 are electronically connected to boxes in the equipment bay 102 as illustrated by example electronically coupled by connection 116 between rudder pedals 114 and flight control electronics 201 box and by connection 117 from the programmable autopilot input device 113 to cockpit security control electronics 203 box and then to the autopilot 202. Flight control electronics 201 box symbolically represents the circuitry that translates the flight control input device 110, 113, and 114 outputs into aerodynamic flight control actuator 205 inputs. Those skilled in the art will realize that this circuitry may be distributed and may be co-located with or intrinsic to each flight control input device 110, 113, and 114. The output of the flight control electronics 201 electronically couples by connection 122 to the cockpit security control electronics 203 as notionally illustrated by the box labeled 203. The cockpit security control electronics 203 also receive inputs from the autopilot 202 by conduit 120. These inputs are destined for flight control actuators 205 to cause movement of aerodynamic flight control surfaces and to other actuators for other aircraft functions. Signals from the programmable autopilot input device 113 are conducted by conduit 117 through the cockpit security control electronics 203 to the autopilot 202 so that inputs to the autopilot 202 from inside the cockpit 101 can be interrupted by the cockpit security control electronics 203. The electronic signals may be digital or analog and the connections may be electrical or fiber optic.

The cockpit security control electronics 203 select the electronic signals originating from the flight control electronics 201 or the output from autopilot 202. Those skilled in the art will appreciate that this selection function may be located within the autopilot 202 or may be otherwise located or distributed. During normal flight, the decision as to which source of flight control signals to use is at the discretion of the authorized pilot. After a change of the occupancy state of a pilot's seat 103 has been detected, the decision as to the source of flight control may be made by the vehicle security system 1000.

The person identification verifier 1140, which may be physically embodied within the cockpit security control electronics 203, determines the authorization of the change of state of occupancy of the pilot's seat 103 based on inputs from person sensors 1100 (106–109 in FIG. 1), the person identification verifier input devices 1130 (111 and 115 in FIG. 1), and a timing circuit 1110. In FIG. 1, the input from the person sensors 106–109 is represented by example by connection 121 from the seat belt interlock 106 to the cockpit security control electronics 203. The input from the person identification verifier input device 115 to the cockpit security control electronics 203 is represented by example by connection 119. The timing circuit 1110 begins when the cockpit security control electronics 203 determines, based on inputs from person sensors 106–109, that a change in the occupancy state of the pilot's seat 103 has occurred. At the same time, the cockpit 101 is interrogated for authorization data. If a valid authorization is not received through the person identification verifier input devices 111 and 115 within a predetermined time, the change in the occupancy state is determined to be unauthorized and a hijacking response is executed. In many embodiments of the invention, the first level of a hijacking response is provided by the station securer 1150.

In many embodiments, the station securer 1150 acts through the cockpit security control electronics 203 to select the autopilot 202 inputs and reject the flight control electronics 201 inputs and autopilot input device 113 inputs. The station securer 1150 may also execute uninterruptible autonomous communications 1160. In many embodiments, the control signal interruption executed by the cockpit security control electronics 203 is part of the station securer 1150 function. The station securer 1150 is configured to interrupt the control signals originating from flight control input devices 110, 113, and 114 through flight control electronics 201, thereby locking out manual control for one station. The station securer 1150 may also include additional functions as explained below.

In a multi-station embodiment of the invention for aircraft, a hijacking response is situationally determined by the vehicle security system 1000. If only one of two or more pilot stations 101 fails authorization, the vehicle security system 1000 executes the station securer 1150. In some embodiments of the invention, the station securer 1150 includes apparatus 203 for preventing the control inputs from a vehicle station from influencing the operation of the vehicle. In embodiments of the invention, the station securer 1150 may also execute uninterruptible autonomous communication 1160 with persons outside the vehicle. In a simpler embodiment, the vehicle control input interruption may be a mechanical disconnect. In a more complex embodiment, the disconnect may be a computer program decision in a fly-by-wire flight control system. The flight control input devices 110, and 114 may be mechanically locked in place, but that is not essential. What is essential is that the flight control input devices 110, 113, and 114 or other vehicle control devices, cease to influence the operation of the vehicle. For flight control input devices 110, 113, and 114 in a fly-by-wire system, this can be accomplished electronically. For other flight control input devices, this can be accomplished mechanically.

For embodiments of the invention in aircraft having some direct hydraulic flight controls, manual control signal interruption may be accomplished by the autopilot 202 by selecting the hydraulic actuator controls normally used by the autopilot. It is also contemplated that the station securer 1150 may automatically mechanically lock the flight control input devices 110 and 114. Some aircraft with autopilots 202 are designed to return to manual control when the pilot manipulates the flight control input devices 10 and 114 beyond a predetermined limit. For embodiments of the invention adapted to both hydraulic and electrical control systems, the station securer 1150 may be configured by one of ordinary skill in the art to interrupt that capability.

A timing circuit 1110 for limiting the response time for authorization may be included within the cockpit security control electronics 203, located elsewhere and then transmit the timing signal to the cockpit security control electronics 203, or may be distributed among several components. For example, the timing signal may come from a GPS receiver, the person sensor 106–109 may operate a switch in the vehicle security electronics 203 to allow the timing signal to enter a counter, and the counter may read the predetermined time from a memory in a networked computer and indicate when that limit has been reached. In some embodiments of the invention, the timing circuit 1110 starts when a change in the occupancy state of the pilot's seat is detected and ends at a predetermined time or upon a determination that the occupancy state change was authorized, whichever happens first. The predetermined time may be pre-selected to allow more than one attempt at correctly entering the authorization input. In a variant of these embodiments, the predetermined time may be varied depending upon subjective factors. For example, if there is reason to suspect a hijacking is imminent, the pilot can select a predetermined time that allows only one attempt at the correct authorization input.

In one or more embodiments of the invention, the person identification verifier 1140 responds to a change in the state of occupancy of the pilot's seat 103 by interrogating 1120 the cockpit for input, waiting a predetermined time for the input, accepting input data from a person, comparing the input data to a stored list of authorization data items, and producing a unique output depending on whether or not the input data matches an item on the list. For example, data can be an alpha-numeric code, retina scan, iris scan, voice print, fingerprint, or the like. In a particular embodiment the person identification verifier 1140 accepts only authorization data which is not available from a dead person, such as a voice print. The person identification verifier input device 111 or 115 is notionally represented in FIG. 2. Person identification verifier input device 111 represents by example input devices near the pilot's head, as for eye scans or voice prints. Person identification verifier input device 115 notionally represents a keypad on the cockpit wall for entering alpha-numeric codes. In an embodiment in a cockpit 101 with two pilot's seats 103 (or a pilot seat 103 and a first officer seat 103, to be formal), the keypads 115 may be positioned so that each cannot be reached by any one who can reach the keypad for the other pilot's station. Those skilled in the art realize that many other devices may be used as input devices.

Likewise, those skilled in the art will realize that devices for interrogating (See 1120) are plentiful. For example, the vibration of a pager, a light on the instrument panel, or an audible alarm will severally or collectively serve the interrogation purpose.

Figure 6:
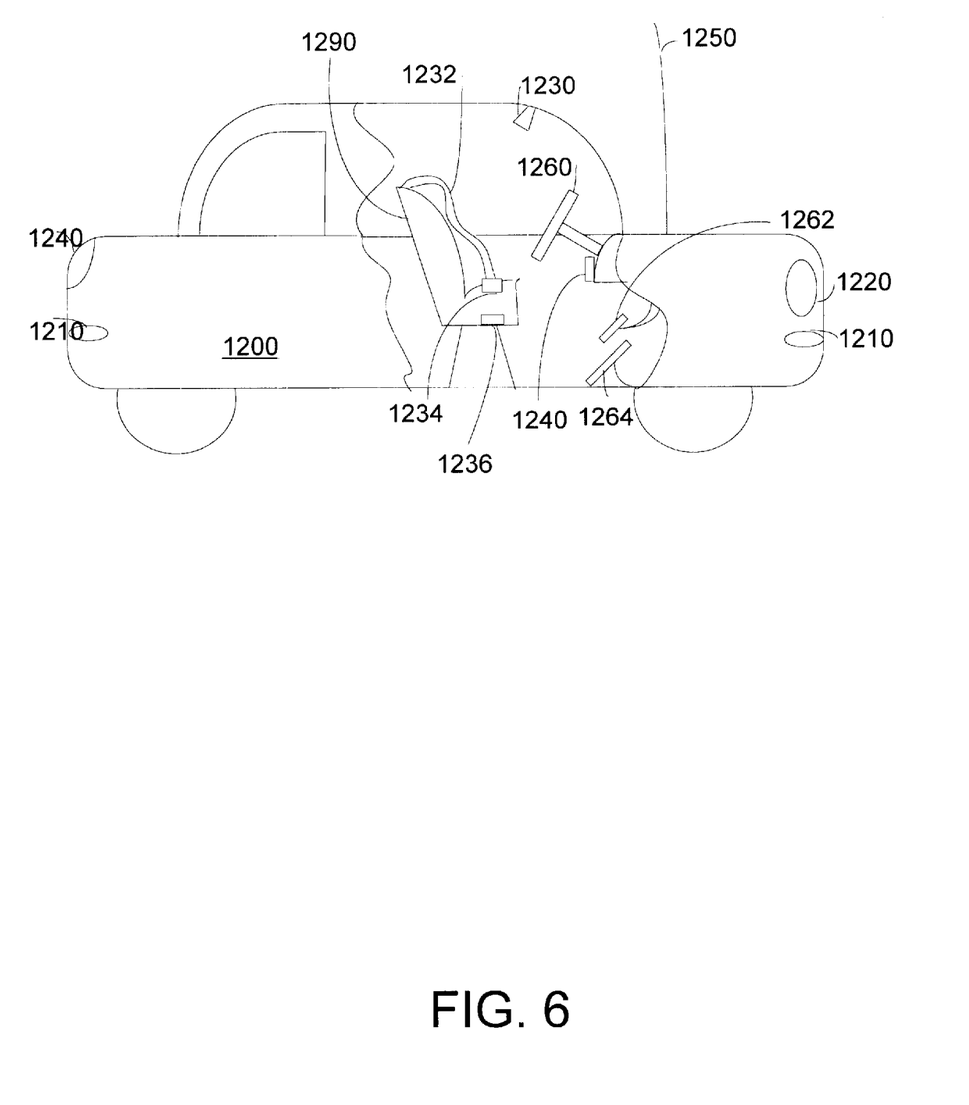
FIG. 6 is a diagram of illustrative physical elements of an embodiment of the present invention for an automobile showing representative relationships between the element.

Another embodiment of the invention is for an automobile 1200, as illustrated in FIG. 6. In this embodiment, the operator is a driver and the driver occupies the driver's seat 1290. The driver's seat 1290 has a seatbelt 1232. The representative vehicle control input devices illustrated are the steering wheel 1260, brakes 1262, and accelerator 1264. Illustrated person sensors 1100 include a seatbelt interlock 1234, a driver mass sensor 1236, and an electromagnetic energy sensor 1230. A representative personal identification verifier input device 1240 is notionally illustrated. For communication with persons outside of the vehicle, the automobile is equipped with emergency flashers 1210, brake lights 1240, headlights 1220 and antenna 1250. Antenna 1250 may be a plurality of antennas for a plurality of wireless communications devices. For an embodiment of the present invention adapted to an automobile, the components 11001150 and 1180 of the vehicle security system 1000 are similar to those for an embodiment for an aircraft as described above. In an automotive embodiment, the control isolator 1170 may be more oriented to mechanical lock-outs than electronic ones. Likewise, uninterruptible autonomous communication 1160 may be more oriented to summoning prompt, local, emergency assistance than to supporting a coordinated national response. In a simpler automotive embodiment, uninterruptible autonomous navigation may amount to bringing the vehicle to a safe stop.

In an embodiment of the invention for commercial airliners, an authorization input code comprises a personal identification code unique to the person seeking authorization, a flight number or work order number, a flight or taxi clearance code from the tower, the aircraft tail number, and a random alphanumeric code. In an embodiment of the invention for commercial automobiles, an authorization input code comprises a personal code unique to the driver or mechanic, a route number or job number, a depot clearance code, the license plate number, and a random code. Generally, the authorization input code sequence provides opportunities for internal verification by connecting the correct operator to approval to move the correct vehicle to the correct destination. In some embodiments, the code sequence is a unique personal code, a vehicle number, a route number, a clearance code, and a random code.

In an aircraft-adapted embodiment, the person identification verifier 1140 contains a plurality of authorization codes for pilots, non-pilots, and non-persons. In embodiments of the invention, authorization is granted when the data input by a person into the person identification verifier input device 1130 (111 and 115 in FIG. 2) matches at least one stored authorization data item.

Also in many embodiments, the person identification verifier 1140 contains relational data to the authorization data items. The relational data is sent automatically to a data user (not shown) upon the event of an input data item matching an authorization data item. A data user is any device responsive to the relational data. The response may be to limit the capabilities of the vehicle for that particular person. Limited capabilities can include speed limits, distance limits, fuel-consumption limits, time-of-operation limits, or geographic limits. For example, the authorization data item matched may be the authorization data item for a non-operator such as an aircraft mechanic. In this case, the relational data may cause the flight control electronics 201 to limit the speed of the aircraft to less than take-off speed. For a further example, the authorization data item matched may be a duress code (a non-person code), and the relational data may indicate a hijacking in progress. In such a case, the data user would be the station securer 1140 which locks out the flight controls associated with that pilot's seat through cockpit security control electronics 203. Relational data appropriate for other flight crew members, air marshals, and persons whose work brings them on-board the aircraft may also be included to limit access to aircraft capabilities. In some embodiments, the relational data may indicate only a hijacking in progress. For example, if the pilot enters "9111" into the person identification verifier input device 115, the relational data would execute the station securers at each control station and then secure the vehicle. When used in an automotive embodiment, the vehicle security system 1000 may be used to limit the time of use, fuel consumption, distance traveled, maximum speed and, for GPS-equipped automobiles, can impose geographic limitations, including altitude, all depending on the vehicle operator's authorization codes and the relational data for that code.

In most embodiments of the invention for aircraft having programmable autopilots and instrument landing systems, when all stations have been secured by station securers 1140, the vehicle securer 1180 executes uninterruptible autonomous navigation 1190. In this state, the aircraft is unresponsive to any inputs from the cockpit. The aircraft may continue on its originally programmed course or adopt a pre-stored, hijack-responsive flight plan can be automatically loaded and executed by the uninterruptible autonomous navigator 1190. In reference to FIG. 4, a new flight plan may be uploaded to the aircraft by an encrypted uplink from an air traffic control center 570 or elsewhere before or after the vehicle is secured. In some embodiments, the autonomous navigator may receive, store, and execute decrypted uploaded flight plans. The decryption step would normally be a function of the uninterruptible autonomous communicator 1160, but may alternatively be included in the uninterruptible autonomous navigator 1190. An example of an alternative source of encrypted flight plan uploads would be another aircraft 510 or a spacecraft 520, or a ship 580. While less than all stations on a given aircraft 500 are secured, the pilot at an unsecured station flies the aircraft 500. This principle may be followed for multi-stationed vehicles, generally.

For embodiments of the invention, a subsystem is regarded as uninterruptible when it is not capable of being interrupted by anyone inside the vehicle through any operator controls, switches, fuses, circuit-breakers, computer inputs, overrides or other means or by access to circuitry, mechanical controls, or hydraulics, directly or through any panel which is accessible during vehicle operation, except through use of a person identification verifier 1140. Embodiments of the invention may require more than one person identification verifier 1140 to be used to interrupt the vehicle security system 1000 or any of its functions 1160 and 1190. "Uninterruptible" may include having an uninterruptible power supply (UPS). UPS systems are known in the art. A UPS can be added as a discrete component or the existing electrical power system may be reconfigured to accomplish the same result. To ensure power availability in flight, the vehicle security system 1000 is immune to the main electrical power switch being turned to "off." In addition to the autonomous systems being uninterruptible, the vehicle security system 1000 itself may also be configured to be uninterruptible.

For many embodiments of the invention, "simultaneous" means within a functionally small interval of time. In the context of dual operator authorization, "simultaneous" means within a time interval that is less than the minimum amount of time it would take for one person to sequentially execute the entry of authorization data into the person identification verifier input device 111 or 115 at any two stations. The specific duration will depend upon the relational arrangement of the two person identification verifier input devices 1130. In a conventional commercial airliner, embodiments may include specific durations of less than one-half second to less than two seconds. In some embodiments of the invention, dual operator authorization is an authorization to re-enable a secured station by two authorized operators entering their authorization data simultaneously at two separate stations. In more specific embodiments, only the final act, such as pressing the "Enter" key or entering the last digit of a code needs to be simultaneous.

In some multi-station embodiments, when all stations have been secured, the vehicle security system 1000 executes the vehicle securer 1150. In such an embodiment, vehicle securer 1150 refers to apparatus for executing uninterruptible autonomous navigation and for adding data to the autonomous communicator's output. In other embodiments of the invention, especially for single-station vehicles, the vehicle securer 1180 may be co-extensive with the station securer 1150 and may execute uninterruptible autonomous communication 1160.

Figure 4:
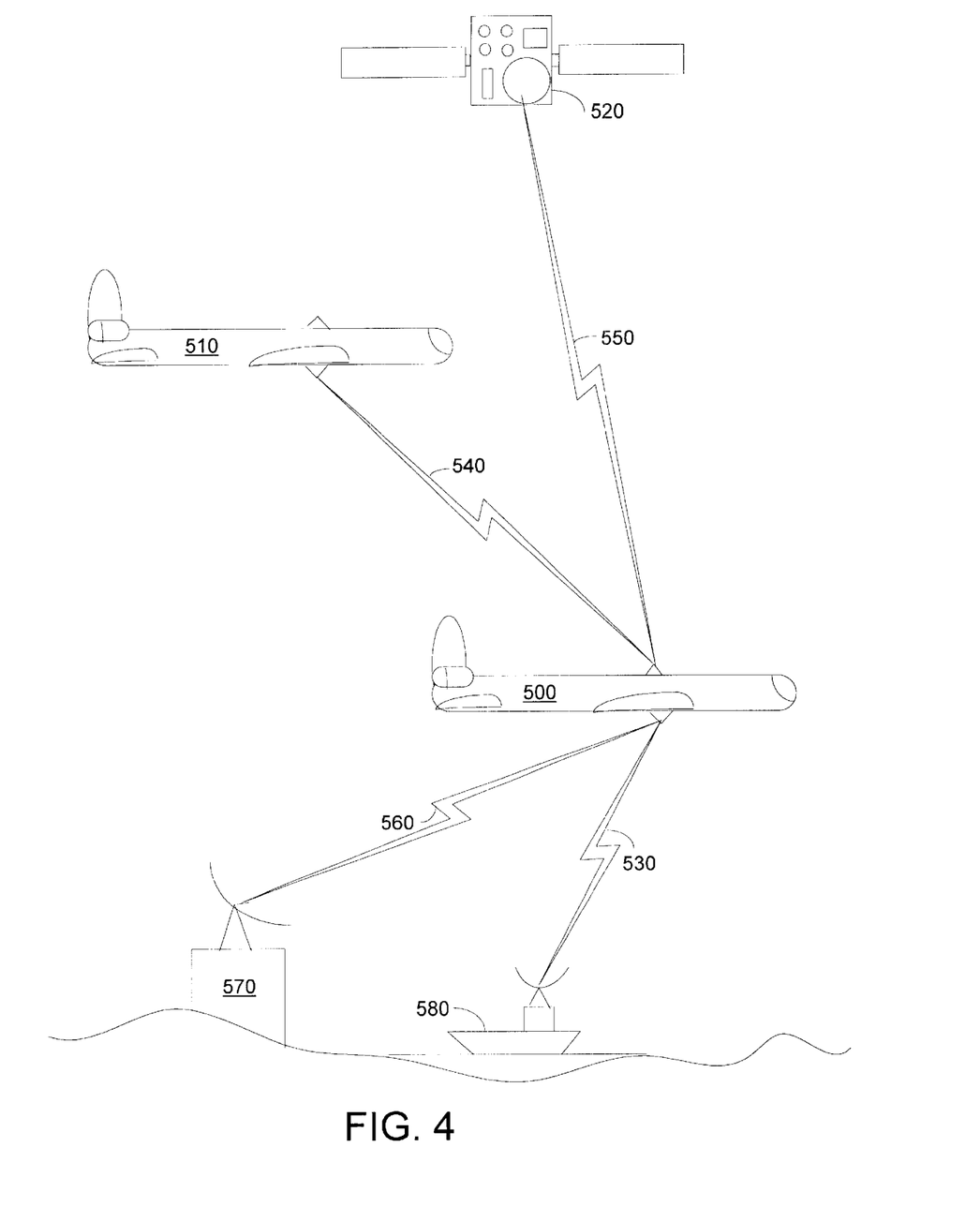
FIG. 4 is a diagram of the communications relationships between a hijacked aircraft and external entities.

For some embodiments, uninterruptible autonomous navigation 1190 may mean an airliner's programmable autopilot 202 loaded with a flight plan that flies the aircraft by instruments to a safe destination and through a safe instrument landing. In a more complex embodiment, the vehicle securer 1180 may cause the uninterruptible autonomous navigator 1190 to load a new, hijack-responsive flight plan when the vehicle securer 1150 executes uninterruptible autonomous navigation 1190. In variants of these embodiments, the vehicle securer 1150 may execute remote vehicle control. In these embodiments, the hijack-responsive flight plan may be loaded upon receiving a command communicated from the ground. Referring to FIG. 4, a hijack-responsive flight plan can be uploaded 530–560 from the ground 570, air 510, sea 580, or outer space 520 during flight and executed by uploaded command, thereby accomplishing remote control of the aircraft. The aircraft end of the communications link (FIG. 5B) is part of the uninterruptible autonomous communicator 1160. An embodiment using remote control of an airliner may also use a sequence of flight plans uploaded from the ground. Examples of considerations for creating a hijack-responsive flight plan are the availability of ILS facilities, routing over sparsely populated areas, and the availability of law enforcement resources at the destination. In some embodiments, a copy of the original flight plan or other default flight plan may be stored so that, in the event the autopilot is disrupted during a hijacking, the original plan can be restored.

In a simpler embodiment of the invention relating to an automobile 1200 (FIG. 8), the uninterruptible autonomous navigation 1190 (FIG. 1) may comprise bringing the automobile 1200 to a safe stop. A more complex automotive embodiment of the invention may uninterruptibly autonomously navigate 1190 the automobile 1200 to the shoulder of the highway using doppler sensors for sensing traffic and avoiding collisions, and image processing to find the shoulder of the road. An even more complex embodiment for an automobile 1200 would add global positioning system navigation and high-precision digital maps to enable long distance road navigation to a safe destination. Those skilled in the art will appreciate the application of the present invention to all forms of transportation that can be controlled using a computer or that can have computerized control systems added to them.

Figure 5A:
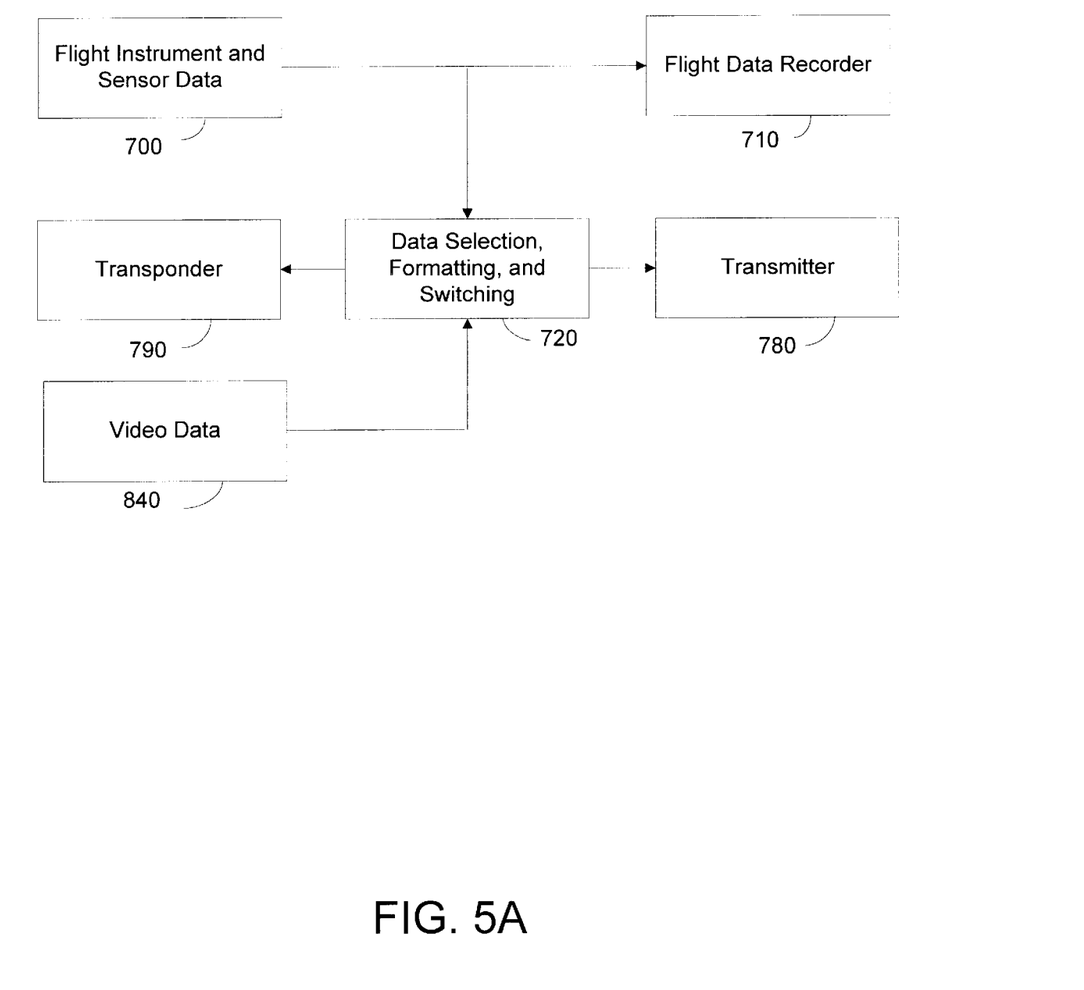
FIG. 5A is a diagram of portion of an exemplary uninterruptible autonomous communicators.
Figure 5B:
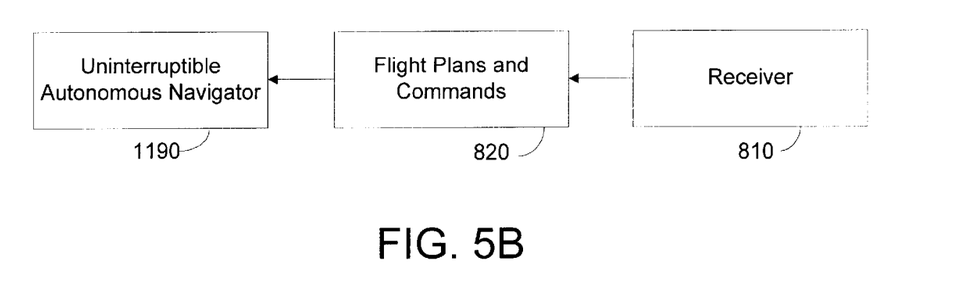
FIG. 5B is a diagram of an additional portion of an exemplary uninterruptible autonomous communicator.
Figure 5C:
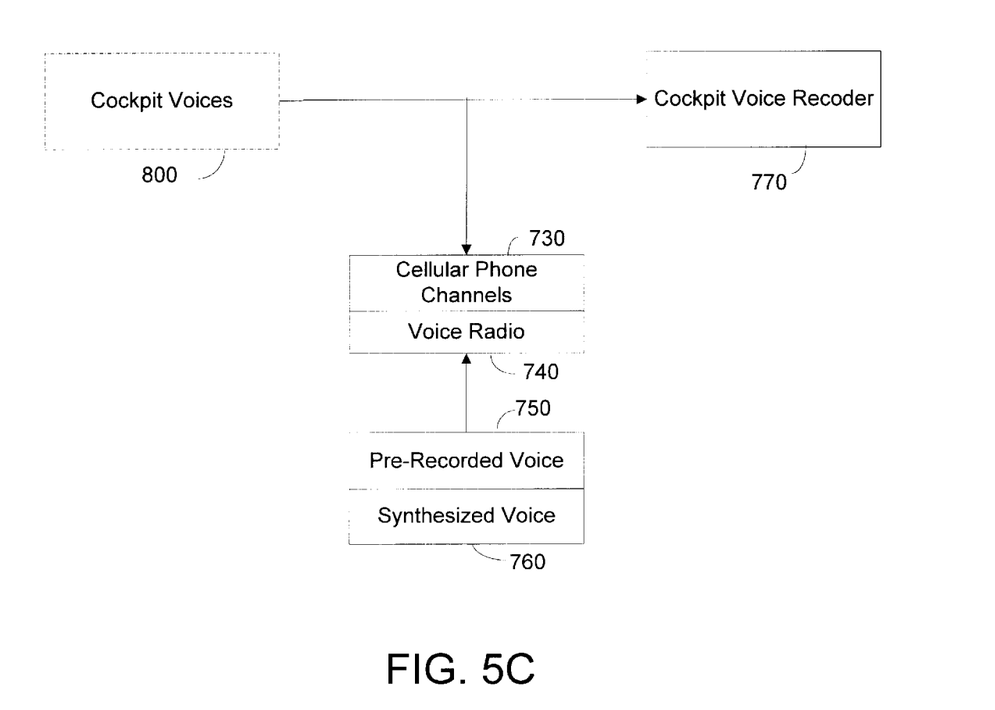
FIG. 5C is a diagram of another additional portion of an exemplary uninterruptible autonomous communicator.

For many embodiments of the invention, uninterruptible autonomous communication 1160 is the operation of a vehicle security system 1000 subsystem for automatically and continuously communicating to persons outside of the vehicle. The subsystem that provides uninterruptible autonomous communication 1160, whether as a discrete component or as a distributed system, is referred to simply as the uninterruptible autonomous communicator 1160. In a simpler embodiment, this can be the brake lights 1240 on an automobile 1200. Refer to FIG. 1, FIG. 5, and FIG. 6. In a more complex embodiment, uninterruptible autonomous communication 1160 refers to a suite of transponders 790 and transmitters 730, 740, and 780 on an airliner 500 sending and receiving digital and/or analog voice, video, command, and telemetry data 730, 740, and 780 to and from ground controllers 570, ships 580, other aircraft 510, and satellites 520.

In an embodiment of the invention, uninterruptible autonomous communication 1160 involves sending information about the state of the vehicle to persons outside the vehicle 530–560. In some embodiments, this can be accomplished by reconfiguring existing systems. For example, referring to FIG. 5A, an aircraft transponder 790 can be made uninterruptible. In some aircraft embodiments, as illustrated in FIG. 5C, a radio 740 for voice communication is integrated with a programmable voice synthesizer 760 or pre-recorded message 750 to automatically speak an appropriate distress message over one or more voice channels 730, 740 in response to station securer 1150 or vehicle securer 1180 initiation. In some embodiments, the uninterruptible autonomous communicator 1160 may be added as a dedicated discrete component.

In embodiments of the invention, as illustrated by the diagram in FIG. 5C, the data 700 or 800 normally recorded in the flight data recorder 710 and cockpit voice recorder 770 is digitized and transmitted to ground stations 570 and 580 (FIG. 4) or other aircraft 510. Rescue beacons to which some satellites 520 are responsive may also be used. Dedicated data sources may also be integrated into the uninterruptible autonomous communicator. For example, as illustrated in FIG. 5A, video data 840 from the cockpit 101 and other compartments can be transmitted 780 to others for evaluation of the situation inside the vehicle. Cell phones 730 (FIG. 5C) adapted for use from aircraft may be programmed to call a responding agency with a pre-recorded 750 or synthesized 760 voice message. Specially formatted 720 data from existing 700 and 800 and dedicated 840 sources, containing the minimum amount of information necessary to enable those outside the vehicle to begin to respond properly, may be communicated.

In some embodiments, uninterruptible autonomous communication involves receiving 810 (FIG. SB) uploads 820 from outside the vehicle. For example, a hijacked airliner could receive a new flight plan and an execution command 820, send it to the uninterruptible autonomous navigator 1190 which loads it into the programmable autopilot (not shown) and then executes the new flight plan. Those skilled in the art will recognize that the boundary between the uninterruptible autonomous navigator 1190 and the uninterruptible autonomous communicator 1160 need not be concise, and some sharing of functions may be appropriate for particular applications.

In some automotive embodiments, uninterruptible autonomous communication 1160 includes recorded or synthesized voice messages both targeted to particular recipients and broadcast to a wide audience. A broadcast means may include a citizen's band or police band radio, for example, while a targeted means may be an automatic cellular telephone, including a satellite cellular phone, call to the police. Satellite communications links from automobiles, as are known in the art, may also be reconfigured to provide targeted uninterruptible autonomous communication 1160. Examples of audible communication that can be made uninterruptible and autonomous include the automobile's horn or an added loudspeaker for pre-recorded or synthesized voice broadcast. Automotive embodiments may also communicate using the vehicles four-way emergency flashers 1210 (FIG. 6), brake lights 1240, or headlights 1220.

Figure 7:
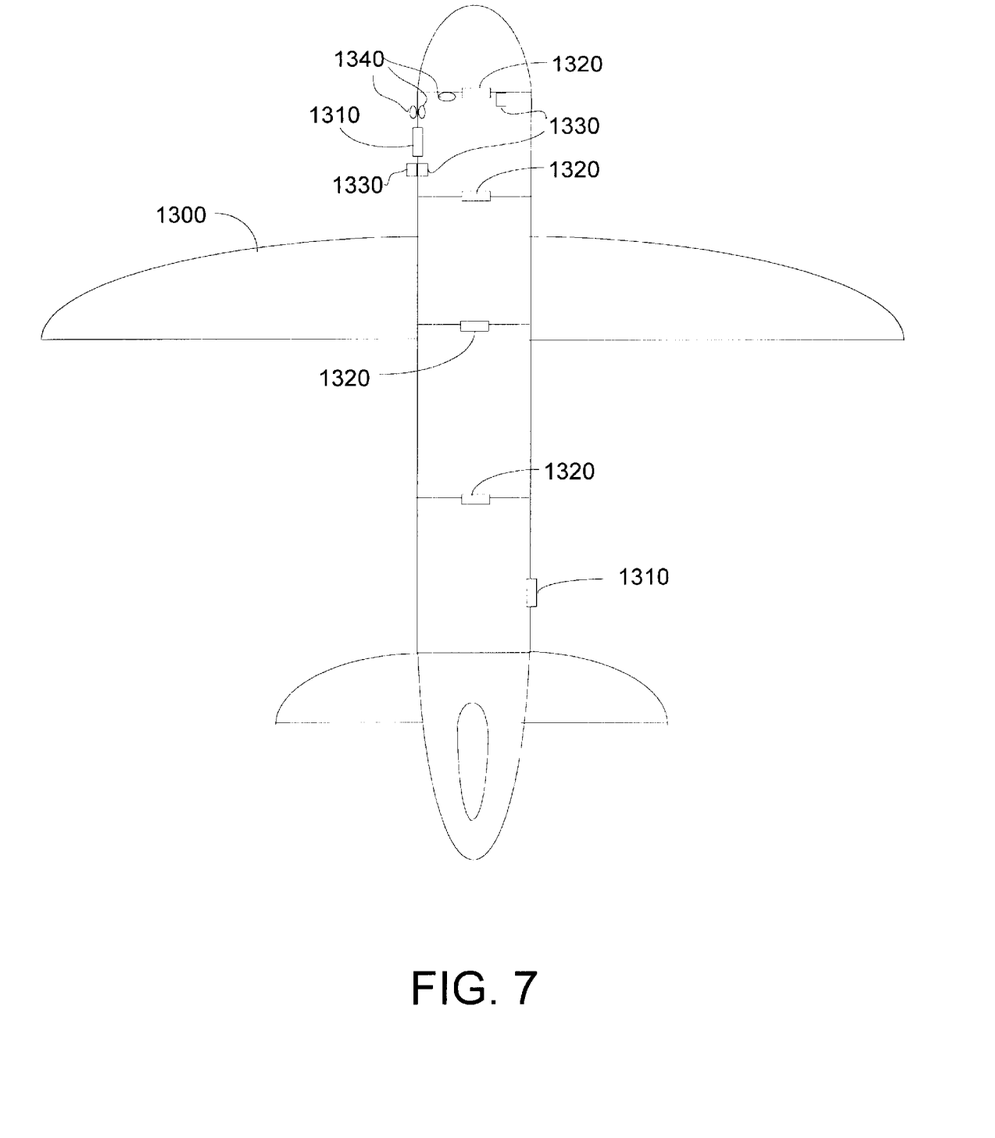
FIG. 7 is a diagram of illustrative physical elements of an embodiment of the present invention for aircraft doors.

Embodiments of a vehicle security system 1300 (FIG. 7) may include security for external 1310 and internal 1320 vehicle doors, including hatches and access panels. In these embodiments, the avenues of access closed by doors become operator stations. The place for the operator to occupy is the position from which the door can be opened and the person who seeks to open the door is the operator. These stations present an obverse of pilot stations, in that door stations may normally be unoccupied. In an embodiment of the invention, person sensors 1330 detect the presence or absence of a person in a position to open the door and the vehicle security system 1300 interrogates for authorization when the state of occupancy changes. The person interrogated enters the authorization code through a person identification verifier 1340 within a predetermined time limit. If the presence or absence of a person is unauthorized, the door securer closes and locks the door and executes uninterruptible autonomous communication 1160 (FIG. 1) to the vehicle operator and others.

In some embodiments, as for very large vehicles including passenger ships, less than all of the doors may be included in the vehicle security system. An authorized operator may open or close and unlock or lock the door. For many embodiments of the invention, the securing of a door does not lead to securing of other vehicle controls nor execute uninterruptible autonomous navigation 1190. In variants of these embodiments, the uninterruptible autonomous communication 1160 executed by the door securer is to people within the vehicle as well as to people outside the vehicle. For example, external communications to a pre-determined law enforcement agency and internal communication to the vehicle operator. In a particular embodiment of the vehicle security system, uninterruptible autonomous communication 1160 from door stations includes video images of the person occupying the place for the door operator.

Figure 3:
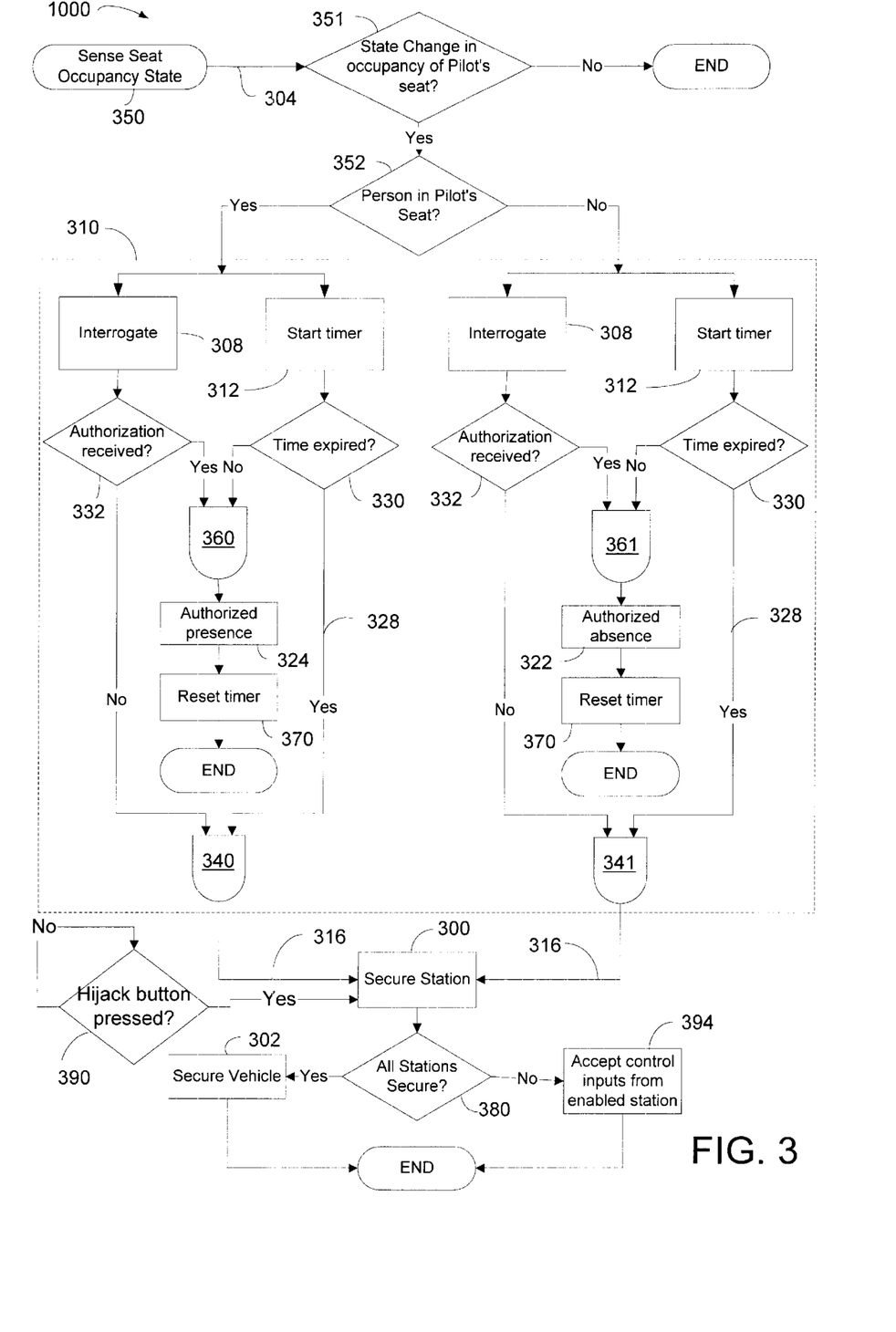
FIG. 3 is a logic flow diagram showing an example of one method of implementing the embodiment.

An embodiment of the method of the vehicle security system for aircraft is illustrated by its process flow in FIG. 3. The method begins with sensing the occupancy state of the of the pilot's seat (step 350). That sensing is monitored 351 for a change in state. If a change in state is detected 314, a decision 352 is taken depending on whether a questionable presence or a questionable absence has been detected. In other embodiments, this decision 352 may be unnecessary. The effect of this decision 352 is to preserve the opportunity to respond differently to an unauthorized absence 341 than to an unauthorized presence 340. Such differences may be included in the data sent by the uninterruptible autonomous communicator 1160 (FIG. 1) or may be more substantive, depending on the particular application. For an example of a situation in which unauthorized presence may demand a different response from an unauthorized absence, consider an automotive sentry vehicle patrolling a military boundary. The unauthorized absence 341 of a driver may indicate that the enemy has attacked, while an unauthorized presence 340 in the sentry vehicle may indicate that the enemy has arrived. The correct responses to these two examples may be substantially different.

The logical process that follows the absence/presence decision 352 may be substantially the same, with only the conclusion being different. At the detection of an occupancy state change 351, timing starts 312 counting a predetermined time and interrogation 308 stimulates the person to enter authorization data. At this point, the output of both logical AND steps 360, 361, 340, and 341, in each branch is low. Note that the labels on the inputs to AND steps 360, 361, 340, and 341 indicate the high state. Only the branch selected by decision 352 will continue to process. For this example, we will follow the "presence" branch. For the upper AND step 360, authorization has not been received, keeping the output low. For the lower AND step 340, time has not expired, keeping the output low. If authorization is received before time expires, the upper AND step 360 goes high, an authorized presence is reported 324, and timing is reset (step 370) which prevents the lower AND process 340 from producing a high. If, on the other hand, time expires 328 before valid authorization is received, the lower AND step 340 goes high, causing the secure station 300 portion of the hijacking response to execute. Notice that, for the embodiment shown in FIG. 3, decision 352 incorporates several steps. "Authorization Received?" 332 includes a decision that input has been entered and that the input matches an authorization data item for person identification verification 310. It may further include steps to reject an input and allow the person to try again to make a proper entry. The secure station step 300 locks out the flight control input devices 110, 113, and 114 (FIG. 2) and executes uninterruptible autonomous communication 1160 (FIG. 1). If, as a result of the secure station step's 300 response to an authorization failure 316, all of the flight control stations have been secured 380, the secure vehicle step 302 executes uninterruptible autonomous navigation 1190 (FIG. 1) and makes appropriate changes to the data being sent by the uninterruptible autonomous communicator 1160. If at least one control station is determined to be enabled 380, the aircraft may be flown 394 from that station.

Some embodiments provide that, if the pilot believes the aircraft is being hijacked, the pilot can circumvent the whole person identification verification 310 process by pressing a "hijack button" 390 to secure all stations 300 and the vehicle 302. The "hijack button" step 390 may literally use a button switch or it may use a special authorization code linked to relational data which causes all stations and the vehicle to be secured 300, 302. Any input device alternative to a button switch will also serve as well.

The foregoing description has described elements of embodiments of the vehicle security system and the relationships of those elements.

While the invention has been particularly shown and described with reference to selected embodiments thereof, it will be readily understood by one of ordinary skill in the art that, as limited only by the appended claims, various changes in form and details may be made therein without departing from the spirit and scope of the invention.

I claim:

1. A vehicle security system in a propelled, controllable vehicle having at least one station for a human vehicle operator, the at least one station comprising vehicle controls and at least one place for the vehicle operator to occupy while operating the vehicle controls, from which at least one station the vehicle operator operates the vehicle using the vehicle controls, the vehicle security system comprising:

at least one person sensor configured to detect at least one of the presence and absence of a person occupying the at least one station;

at least one person identification verifier responsive to the at least one person sensor, configured to determine if the presence of a person occupying the at least one station is authorized; and at least one station securer configured to secure the at least one station responsive to at least one of the person sensor and the person identification verifier.

2. The vehicle security system of claim 1 comprising at least one timing device responsive to the at least one person sensor and the at least one person identification verifier and configured to count an interval of time beginning responsive to the at least one person sensor and ending responsive to the person identification verifier and a predetermined time limit.

3. The vehicle security system of claim 1 wherein the at least one person identification verifier is further configured to determine if the absence of a vehicle operator is authorized.

4. The vehicle security system of claim 1 wherein the at least one station is a plurality of stations comprising at least one person identification verifier for each of the plurality of stations, the resulting plurality of person identification verifiers being separately located to ensure independence of authorization data entry during dual operator authorization.

5. The vehicle security system of claim 1 wherein the at least one person identification verifier comprises a keypad for manually entering data as a code sequence.

6. The vehicle security system of claim 5 wherein the code sequence comprises at least one of a unique personal identification code, a route number, a clearance code, a vehicle number, and a random code.

7. The vehicle security system of claim 6 wherein the vehicle is an aircraft, the route number is a flight number, the clearance code is a flight clearance code, and the vehicle number is the aircraft's tail number.

8. The vehicle security system of claim 6 wherein the vehicle is a delivery truck, the route number is a delivery route number, the clearance code is a depot clearance code, and the vehicle number is the truck's license plate number.

9. The vehicle security system of claim 1 wherein the at least one person identification verifier comprises a plurality of stored authorization data items for at least one of operators, non-operators, and non-persons for comparison to data entered by at least one of persons seeking authorization and persons seeking to activate non-person functions.

10. The vehicle security system of claim 9 wherein the at least one person identification verifier comprises additional stored data related to each authorization data item, the additional data communicated automatically to a data user upon a successful match between input data and stored authorization data.

11. The vehicle security system of claim 10 wherein the additional data related to at least one non-person authorization data item indicates that a hijacking is in progress, the data users comprise the at least one station securer and the at least one vehicle securer, and the at least one station securer and the at least one vehicle securer are responsive to the additional data to secure all of the at least one stations and to secure the vehicle.

12. The vehicle security system of claim 10 wherein the additional data indicates limitations on capabilities of the vehicle, the data user comprises the vehicle control system, and the vehicle control system is responsive to the data to limit the capabilities of the vehicle.

13. The vehicle security system of claim 12 wherein the vehicle control system is configured to prevent the vehicle from exceeding at least one of a speed limit, a distance limit, a fuel-consumption limit, a time-of-operation limit, and a geographic limit, in response to additional data relating to authorization codes assigned to vehicle operators.

14. The vehicle security system of claim 12 wherein the vehicle is an aircraft and the vehicle control system is configured to prevent the aircraft from reaching take-off speed in response to additional data relating to authorization codes assigned to non-pilots.

15. The vehicle security system of claim 12 wherein the vehicle is an automobile, and the vehicle control system is configured to prevent the automobile from exceeding at least one of a speed limit, a distance limit, a fuel-consumption limit, and a time-of-operation limit, each in response to additional data relating to authorization codes assigned to drivers.

16. The vehicle security system of claim 15 wherein the vehicle is equipped with a global positioning system receiver, and the vehicle control system is configured to prevent the automobile from exceeding at least one geographic limit in response to additional data relating to authorization codes assigned to drivers.

17. The vehicle security system of claim 10 wherein the additional data indicates that a duress code has been matched and the data user comprises at least one of the vehicle control system, the at least one station securer, and the at least one vehicle securer, being responsive to the additional data to implement a duress response.

18. The vehicle security system of claim 1 in which the place for the vehicle operator to occupy in the at least one station is a seat having a seat belt, the station comprising at least one person sensor.

19. The vehicle security system of claim 18 wherein the at least one person sensor comprises a seat belt interlock.

20. The vehicle security system of claim 19 further comprising at least one circuit in the seat belt webbing configured to sense if the seat belt has been severed.

21. The vehicle security system of claim 18 wherein the at least one person sensor comprises at least one mass sensor responsive to the mass of a seated person.

22. The vehicle security system of claim 1 wherein the at least one person sensor comprises at least one electromagnetic energy sensor responsive to at least one wavelength of electromagnetic energy that is at least one of emitted from a person and reflected by a person.

23. The vehicle security system of claim 1 wherein the at least one station securer is configured to prevent the operation of the vehicle from being influenced by the vehicle controls associated with the at least one station being secured.

24. The vehicle security system of claim 23 wherein the at least one station securer is configured to execute uninterruptible autonomous communication.

25. The vehicle security system of claim 24 wherein uninterruptible autonomous communication comprises at least one of dedicated communications components and existing communications components reconfigured to be uninterruptible and autonomous.

26. The vehicle security system of claim 24 wherein uninterruptible autonomous communication comprises a plurality of ground, air, sea, and outer space communications facilities configured to at least one of send and receive at least one of clear-channel and encrypted at least of voice, command, telemetry, video, data files, and other data between the vehicle and at least one other of the plurality of communications facilities.

27. The vehicle security system of claim 24 wherein the vehicle is an aircraft and uninterruptible autonomous communication is configured to receive, decrypt, and upload to the uninterruptible autonomous navigator at least one flight plan and at least one command to execute the at least one flight plan.

28. The vehicle security system of claim 24 wherein the vehicle is an aircraft and uninterruptible autonomous communication is configured to receive, decrypt, and execute a command to interrogate at least one station for authorization input.

29. The vehicle security system of claim 1 further comprising at least one vehicle securer responsive to the at least one station securer to secure the vehicle when a predetermined set of the at least one stations are secure.

30. The vehicle security system of claim 29 further comprising at least one uninterruptible autonomous navigator responsive to the at least one vehicle securer.

31. The vehicle security system of claim 30 wherein the vehicle is an aircraft having a programmable autopilot and wherein the autonomous navigator is configured to load a hijack-responsive flight plan into the autopilot and execute execution of the hijack-responsive flight plan.

32. The vehicle security system of claim 31 wherein the autonomous navigator is configured to receive, store, and execute a hijack-responsive flight plan originally transmitted from outside the aircraft.

33. The vehicle security system of claim 30 wherein the vehicle is an automobile and wherein the uninterruptible autonomous navigator is configured to decelerate the vehicle to a stop.

34. The vehicle security system of claim 29 further comprising an uninterruptible autonomous communicator responsive to the vehicle securer.

35. The vehicle security system of claim 34 wherein the vehicle is an automobile and uninterruptible autonomous communication comprises automatically and turning on and uninterruptibly operating the emergency flashers and brake lights.

36. The vehicle security system of claim 35 wherein the automobile is configured for uninterruptible autonomous voice communications having at least one channel.

37. The vehicle security system of claim 36 wherein autonomous communication comprises sending at least one distress message to at least one of a predetermined service provider and a broadcast audience over the uninterruptible autonomous voice communications at least one channel.

38. The vehicle security system of claim 1 wherein the vehicle is an aircraft, the aircraft having at lease one compartment with at least one avenue of access to its interior from its exterior, the at least one avenue of access having a door, the vehicle security system further comprising:
    at least one person sensor configured to detect at least one of the presence and absence of a person positioned at the door;
    at least one person identification verifier responsive to the at least one person sensor, configured to determine if the person detected is authorized to open the door; and
    at least one door securer configured to secure the door responsive to the at least one person identification verifier.

39. The vehicle security system of claim 38 wherein the aircraft comprises a plurality of compartments and avenues of access between the compartments.

40. The vehicle security system of claim 39 wherein the door securer comprises an automatic door lock, an uninterruptible autonomous communicator, at least one video camera deployed to regard the area that would be occupied by a person positioned to open the door, and a video display in the cockpit configured to receive video from the at least one video camera.

41. The vehicle security system of claim 40 wherein the uninterruptible autonomous communicator is configured to send data to at least one predetermined law enforcement services provider, alerting the provider that an unauthorized person has attempted entry and providing data to assist in the investigation.

42. The vehicle security system of claim 38 comprising at least one timing device responsive to the at least one person sensor and the at least one person identification verifier, configured to count an interval of time beginning responsive to the at least one person sensor and ending responsive to the person identification verifier and to a predetermined time limit.

43. A method for preventing a hijacker from gaining control of the flight of an aircraft, the aircraft having at least one station for a human pilot, the station comprising a set of flight control input devices and a pilot's seat to occupy, from which at least one station the pilot flies the aircraft using the flight control input devices, the method comprising:
    detecting changes in the occupancy state of the at least one pilot's seat;
    interrogating for at least one authorization data input in response to a change in the occupancy state of the at least one pilot's seat;
    determining whether the change in the occupancy state of the at least one pilot's seat is authorized or unauthorized, in response to receiving an input; and
    responding to the state of authorization of the state of occupancy of the at least one pilot's seat by at least one of continuing normal flight and executing a hijack response.

44. The method for preventing a hijacker from gaining control of the flight of an aircraft of claim 43 wherein the method comprises waiting a pre-determined time to receive an input in response to interrogating.

45. The method of claim 43 wherein executing a hijack response comprises:
    securing the flight control input devices associated with the at least one pilot's seat for which the occupancy state change is unauthorized; and
    executing uninterruptible autonomous communication.

46. The method of claim 45 wherein executing a hijack response further comprises:
    detecting the state of each set of flight control input devices and
    detecting that all the sets of flight control input devices have been secured; and
    executing uninterruptible autonomous navigation.

47. The method of claim 43 wherein detecting changes in the occupancy state of the pilot's seat comprises:
    providing at least one person sensor configured to sense at least one of a person occupying the at least one pilot's seat and no person occupying the pilot's seat;
    sensing at least one of occupancy and vacancy of the pilot's seat;
    observing the sensed state of the pilot's seat for changes; and
    signaling the changes in the occupancy state of the pilot's seat.

48. The method of claim 43 wherein determining whether the change in the occupancy state of the at least one pilot's seat is authorized or unauthorized comprises:
    comparing any input to at least one authorization data item to find a match;
    reporting the person as authorized if the input made within the pre-determined time matches at least one authorization data item; and
    reporting the person as unauthorized if the input is not made within the pre-determined time or if the input made within the pre-determined time does not match the at least one authorization data item.

* * * * *